US008902047B2

(12) United States Patent
Ku et al.

(10) Patent No.: US 8,902,047 B2
(45) Date of Patent: Dec. 2, 2014

(54) RFID SYSTEM AND METHOD OF TRANSMITTING LARGE DATA OF PASSIVE RFID

(75) Inventors: Ja-nam Ku, Yongin-si (KR); Seon-wook Kim, Namyangju-si (KR); Joon-goo Lee, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 897 days.

(21) Appl. No.: 12/259,312

(22) Filed: Oct. 28, 2008

(65) Prior Publication Data

US 2009/0219142 A1 Sep. 3, 2009

(30) Foreign Application Priority Data

Feb. 29, 2008 (KR) ........................ 10-2008-0019252

(51) Int. Cl.
*H04Q 5/22* (2006.01)
*G06K 19/07* (2006.01)
*H04L 29/06* (2006.01)
*H04W 28/06* (2009.01)
*H04W 84/18* (2009.01)

(52) U.S. Cl.
CPC .......... *G06K 19/0723* (2013.01); *H04W 84/18* (2013.01); *H04L 69/08* (2013.01); *H04W 28/06* (2013.01)
USPC ........................................ 340/10.3; 340/10.1

(58) Field of Classification Search
CPC .................................................. G06K 7/0008
USPC .............. 340/10.1–10.51; 370/465, 470–472, 370/474–476
See application file for complete search history.

(56) References Cited

U.S. PATENT DOCUMENTS

| | | | | |
|---|---|---|---|---|
| 4,868,816 A | * | 9/1989 | Katsumata et al. | 370/449 |
| 5,307,349 A | * | 4/1994 | Shloss et al. | 370/442 |
| 5,887,176 A | * | 3/1999 | Griffith et al. | 713/320 |
| 6,608,551 B1 | * | 8/2003 | Anderson et al. | 340/10.51 |
| 2003/0140149 A1 | * | 7/2003 | Marejka et al. | 709/229 |
| 2004/0264441 A1 | * | 12/2004 | Jalkanen et al. | 370/352 |
| 2005/0198247 A1 | * | 9/2005 | Perry et al. | 709/223 |

(Continued)

FOREIGN PATENT DOCUMENTS

| | | |
|---|---|---|
| JP | 2004-228923 A | 8/2004 |
| KR | 10-2005-0007006 A | 1/2005 |

(Continued)

OTHER PUBLICATIONS

Korean Office Action issued Apr. 15, 2014 in counterpart Korean Patent Application (3 pages, in English).

*Primary Examiner* — Kerri McNally
*Assistant Examiner* — Kam Ma
(74) *Attorney, Agent, or Firm* — NSIP Law

(57) ABSTRACT

Provided are a radio frequency identification (RFID) system including an RFID reading apparatus and a passive RFID tag and a method of transferring and/or processing data using the same. An RFID reading apparatus includes a data input unit which receives data to be transferred to a passive RFID tag, a control unit which generates a transmission packet containing the data and a command directing data transfer, and a communication unit which converts the generated transmission packet into an RF signal and transfers the converted RF signal to the passive RFID tag.

20 Claims, 6 Drawing Sheets

(56) References Cited

U.S. PATENT DOCUMENTS

| | | | |
|---|---|---|---|
| 2006/0069814 A1* | 3/2006 | Abraham et al. | 710/8 |
| 2006/0133160 A1* | 6/2006 | Dickin et al. | 365/189.05 |
| 2006/0143439 A1* | 6/2006 | Arumugam et al. | 713/153 |
| 2006/0210092 A1 | 9/2006 | Navid | |
| 2006/0258289 A1* | 11/2006 | Dua | 455/41.3 |
| 2006/0279412 A1* | 12/2006 | Holland et al. | 340/10.51 |
| 2007/0204077 A1* | 8/2007 | Ootsuka et al. | 710/35 |
| 2008/0151976 A1* | 6/2008 | Stoye | 375/219 |
| 2008/0186136 A1* | 8/2008 | Raphaeli et al. | 340/10.1 |
| 2009/0214037 A1* | 8/2009 | Tuttle | 380/270 |

FOREIGN PATENT DOCUMENTS

| | | |
|---|---|---|
| KR | 10-2007-0006504 A | 1/2007 |
| KR | 10-2007-0052352 A | 5/2007 |
| KR | 10-2007-0054071 A | 5/2007 |
| WO | WO 2006/030290 A2 | 3/2006 |

\* cited by examiner

| Command | Important | Short ID | SeqNum | EndSig | Len | Bitstream | CRC16 |

RFID SYSTEM AND METHOD OF TRANSMITTING LARGE DATA OF PASSIVE RFID

CROSS REFERENCE TO RELATED APPLICATIONS

This application claims the benefit under 35 U.S.C. §119 (a) of a Korean Patent Application No. 10-2008-0019252, filed on Feb. 29, 2008 in the Korean Intellectual Property Office, the disclosure of which is incorporated herein in its entirety by reference.

TECHNICAL FIELD

The following description relates to a radio frequency identification (RFID) system, and more particularly, to an RFID system including a passive RFID tag and an RFID reading apparatus and a method of transferring and/or processing data using the same.

BACKGROUND

A radio frequency identification (RFID) system may identify a thin flat-shaped tag adhered to an object, that is, an RFID tag, without touching it by use of a frequency signal, and process information about the object.

In a conventional passive RFID system, an RFID tag is provided with a power from a frequency signal of an RFID reading apparatus. The RFID tag uses an antenna and a rectifier to rectify a carrier frequency through the antenna to a direct current voltage to operate a digital circuit of the RFID tag.

The RFID tag may recognize a command defined by the RFID reading apparatus and parameters relevant to the command, and transmit data stored in the RFID tag or information related to a status of the RFID tag to an RFID tag reader as a tag response. In this case, since the power available for a digital circuit is limited, distance of data communication may be normally no more than 10 m. Furthermore, a conventional RFID system is typically for reading an identification code of a small size stored in a memory of the RFID tag.

SUMMARY

In one general aspect, there is provided a radio frequency identification (RFID) reading apparatus and a passive RFID tag that may be used to transmit and receive large data, such as audio data, video data, and data files, by expanding a command-response structure generally used for a passive RFID communication protocol.

In another general aspect, a radio frequency identification (RFID) reading apparatus comprises a data input unit which receives data to be transferred to a passive RFID tag, a control unit which generates a transmission packet containing the data and a command directing data transfer, and a communication unit which converts the generated transmission packet into an RF signal and transfers the converted RF signal to the passive RFID tag.

The data may include at least one of audio data, image data, and data files.

The data input unit may receive the data from an external multimedia reproducing device or a storage medium.

The transmission packet may comprise a command field indicating a BURST command that directs large data transfer and a bitstream field including bitstream data.

The transmission packet may further comprise an important field that indicates an integrity test result of the bitstream data.

The transmission packet may further comprise an identification field that includes identification information for identifying an RFID tag in order to transfer data to a particular RFID tag.

The control unit may generate a transmission packet including a BURST ACK command that requests a response to check whether the RFID tag has processed the transmitted transmission packet successfully after the transmission packet including the BURST command is received.

In still another general aspect, a passive RFID tag comprises an RFID tag module which processes a transmission packet that comprises data and a command directing data transfer transmitted through an RF signal, and a data transmitting unit which extracts data from the transmission packet and transfers the data to a data processing unit.

The data may include at least one of audio data, image data, and data files.

The transmission packet may comprise a command field indicating a BURST command that directs large data transfer and a bitstream field including bitstream data.

The transmission packet may further comprise an important field that indicates an integrity test result of the bitstream data.

The RFID tag module may interpret identification information of the transmission packet for identifying an RFID tag and process the transmission packet where the interpreted identification information is identical with the identification information of the passive RFID tag, and the RFID tag module may request an RFID reading apparatus, which has sent the transmission packet, to resend the transmission packet where information of the important field indicates that the integrity of the bitstream data is maintained.

The data transmitting unit may transmit a result of processing the transmission packet in response to receiving a transmission packet comprising a BURST ACK command that requests a response to check whether the passive RFID tag has processed the transmitted transmission packet successfully after the transmission packet including the BURST command is received.

The passive RFID tag may further comprise a data processing unit which processes data included in the transmission packet, and an output unit which outputs the processed data.

In yet another general aspect, a data transfer method of an RFID reading apparatus comprises receiving data to be transferred to a passive RFID tag, generating a transmission packet comprising data and a command directing data transfer, and converting the generated transmission packet into an RF signal and transferring the RF signal to the passive RFID tag.

The transmission packet may comprise a command field indicating a BURST command that directs large data transfer and a bitstream field including bitstream data.

The data transfer method may further comprise generating and transmitting a transmission packet including a BURST ACK command that requests a response to check whether the passive RFID tag has processed the transmitted transmission packet successfully after transmitting the transmission packet comprising the BURST command.

In yet another general aspect, a data processing method of a passive RFID tag comprises processing a transmission packet which comprises data and a command directing data transmitted through an RF signal from an RFID reading apparatus, and extracting data from the transmission packet and transferring the data to a data processing device.

The data processing method may further comprise interpreting identification information of the transmission packet for identifying an RFID tag and processing the transmission packet where the interpreted identification information is identical with the identification information of the passive RFID tag.

The data processing method may further comprise transmitting a result of processing the transmission packet in response to receiving transmission packet comprising a BURST ACK command that requests a response to check whether the passive RFID tag has processed the transmitted transmission packet successfully after receiving the transmission packet including the BURST command.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

Figures 1, 2:
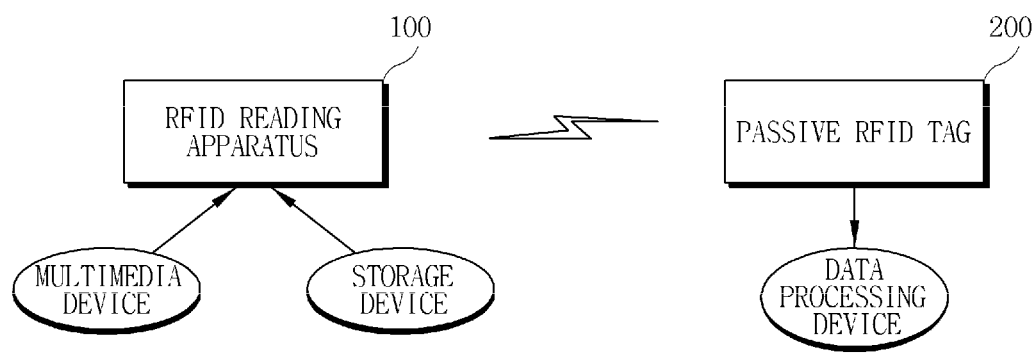
FIG. 1 is a diagram illustrating a radio frequency identification (RFID) system for data transmission according to an exemplary embodiment.
FIG. 2 is a diagram illustrating a transmission packet including a burst command according to an exemplary embodiment.

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness FIG. 1 illustrates a radio frequency identification (RFID) system for data transmission according to an exemplary embodiment.

A conventional RFID system may store data in a memory of an RFID tag, or transmits stored data in the memory to an RFID reading apparatus. Since power available to the RFID tag is small, only a small amount of data may be read or written by the RFID tag. Thus, according to a conventional passive RFID communication protocol, there is a command for an RFID reading apparatus to send only short data and, generally, a number of bytes to an RFID tag. Such a command is for data to be written in a memory of the RFID tag, and thus the actual size of the data to be transmitted may be limited to a couple of bytes because of the power consumption.

According to an exemplary embodiment, an RFID reading apparatus 100 may transmit data including streaming data, such as voice data, music data, image data, and moving pictures data, which may be continuously transmitted to be reproduced, as well as general digital data such as files to a passive RFID tag 200. The passive RFID tag 200 may transmit the received data to a data processing device, which processes the data and may output a result. The data processing device may be embodied as a single unit with the passive RFID tag 200 or external to the RFID tag 200.

For the passive RFID tag 200 to perform data processing, a "data" state may be additionally included in tag states defined by an existing RFID communication protocol. The data state in which the data is received may be recognized after an "open" state or a "secured" state.

To transmit a large amount of data, a command for transmitting data of several to tens of megabytes may be defined. According to an exemplary embodiment, a command BURST is defined for large data transmission. A command BurstAckVS (burst acknowledgement with Very Short ID) is defined for checking whether each tag processes the corresponding command successfully after the command BURST is sent for the large data transmission. A transmission packet including such commands will be described with reference to FIGS. 2 and 3.

Also, the passive RFID tag 200 may transmit the data to the external data processing device that processes the data, without storing the data in a memory of the passive RFID tag 200, transferred using a defined command, so as to utilize the data without power consumption. Furthermore, the passive RFID tag 200 may generate a response signal corresponding to data received from the external data processing device and transmit the response signal to the RFID reading apparatus 100.

Using a passive RFID system according to an exemplary embodiment, unlike the conventional RFID system that may obtain simple information of a particular object, a large amount of data may be transferred to an object. For example, it is assumed that there is a cup including a solar battery, a sensor and a display device and the cup may display the temperature of its contents. Conventionally, it may be difficult to obtain the power for wireless communication from the solar battery, and thus the cup may only perform the original functions, that is, measure the temperature and display it. On the other hand, where a passive RFID system according to an exemplary embodiment capable of transferring a large amount of data is employed to the cup, the cup may receive useful information from one or more RFID reading apparatuses around the cup and display the information on its display by way of a wireless communication, so as to expand its functionality.

FIG. 2 illustrates a configuration of a transmission packet including a burst command to be transferred from an RFID reading apparatus to a passive RFID tag, according to an exemplary embodiment.

As illustrated in FIG. 2, the transmission packet comprises several fields such as Command, Important, Short ID, Sequence Number (referenced as SeqNum), EndSig, a length (referenced as Len), Bitstream, and a CRC field (referenced as CRC16).

The command field may include a bit pattern that indicates a command is for large data transfer. In the command field, a four-bit command 1011b which is emptied from IS018000-6 type C may be used.

The important field may be used for checking whether a corresponding packet is valid by performing integrity check for a bitstream transmitted by use of the command, and for recording the checked result. For example, where the important field has a value of 0, which may be originally 1 bit, the communication with such important field is considered not reliable, and thus a communication does not require a response from the RFID tag. On the other hands, where the important field is 1, it indicates that the communication is reliable.

The Short ID field may be a short identification code field for identifying each RFID tag where data is desired to be sent to a particular RFID tag. Such Short ID field may be 7-bit in order to have short ID newly defined for the effective configuration of the command. The Short ID field may use the actual ID or new IDs of different lengths.

According to an exemplary embodiment, the Short ID field is defined as '0000000b' in the case of the burst command transmission, so that all passive RFID tags within the recognition range may process the transmission packet including the BURST command. Accordingly, data broadcasting may be implemented. Furthermore, a one-to-one communication may be implemented by having a Short ID field include an identifier of an RFID tag of an opponent in the one-to-one communication. Where a resend is not necessary, the Short ID field may be omitted.

The sequence number (SeqNum) field may indicate the order of the bitstreams to be sent by the corresponding command. The sequence number field may be formed of 16 bits, and a communication protocol that is useful for efficient acknowledgement may be formed by using such field.

The EndSig field may indicate that a bitstream transmitted by a corresponding command is the last of the bitstream to be sent. The EndSign field may be a one-bit field, and the value of may indicate that there is a bit to be transmitted and the value of 1 may indicate that there is no bit to be transmitted.

The length field may specify the length of the bitstream which will be transmitted. The length of the bitstream may vary according to the channel status and a configuration of a system. The length field may be represented by 4 bits, or may be defined such that a stream of $2^{Len}*32$ bytes may be transmitted.

The bitstream field may be a list of bits and may be arbitrary data. For example, data with a length of $2^{Len}*32$ bytes may be included in the bitstream field.

The CRC field may include additional bits for integrity test on the packet. Although the CRC field is illustrated as CRC16 in FIG. 2, the CRC field may include other additional bits for integrity test methods using CRC32, or a parity bit or checksum, or for using a method combined from two different integrity test methods.

Figure 3:
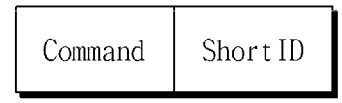
FIG. 3 is a diagram illustrating a transmission packet including a BURST ACK command according to an exemplary embodiment.

FIG. 3 illustrates a configuration of a transmission packet including a BURST ACK command to be transmitted from an RFID reading apparatus to a passive RFID tag, according to an exemplary embodiment. The BURST ACK command may be for checking whether after a packet including a BURST command for large data transfer is sent, each tag has performed a corresponding command successfully. For a quick response, the BURST ACK command may be formed in a manner that uses bits limitedly. A field may be added for a function expansion where desired. The BURST ACK command may comprise a command field and a ShortID field. The command field may include a field indicating a corresponding command is a BURST ACK command, and the ShortID field may be used for identifying a tag represented by a short ID.

Figure 4:
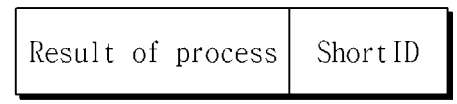
FIG. 4 is a diagram illustrating a response packet according to an exemplary embodiment.

FIG. 4 illustrates a configuration of a response packet to be transmitted to an RFID reading apparatus from a passive RFID tag, according to an exemplary embodiment. Commands as shown in FIGS. 2 and 3 are transmitted to the passive RFID tag, and the passive RFID tag transmits to the RFID reading apparatus the response packet informing the result of process. According to an exemplary embodiment, the response packet may comprise a result of process field that shows the result of the passive RFID tag processing the command, and a tag identifier field indicating the identifier of the passive RFID tag.

The result of process field may be shown by one bit where there is a CRC error on the BURST command, and define whether the passive RFID tag has processed data or whether the error occurs in the sequence number as an error code by adding a field or expanding bits.

Figure 5:
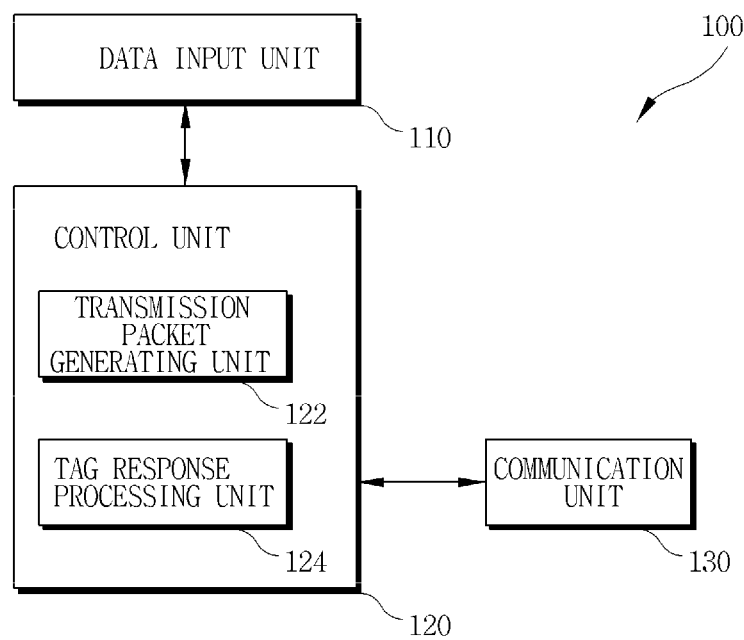
FIG. 5 is a block diagram illustrating an RFID reading apparatus according to an exemplary embodiment.

FIG. 5 illustrates an RFID reading apparatus 100 according to an exemplary embodiment.

As illustrated in FIG. 5, the RFID reading apparatus 100 comprises a data input unit 110, a control unit 120, and a communication unit 130. Each element of the RFID reading apparatus 100 may be implemented as software using programs executed in a universal processor or a digital signal processor, or as one or more chips, modules or system on chip (SoC) or package on chip (PoC) using FPGA or ASIC.

The data input unit 110 may receive various formats of data to be transmitted to the passive RFID tag 200 (referring to FIG. 1) from various forms of external multimedia apparatuses, such as computers, MP3 players, portable multimedia players (PMPs), and cameras, or data storage apparatuses. The data may include at least one of audio data, image data and data files, and the types or formats of data are not limited.

The data input unit 110 may store input data in a buffer (not shown) and transfer data to the control unit 120 where a sufficient amount of data to form a command is received, such as a BURST command, of the RFID reading apparatus 100. Furthermore, the data input unit 110 may include a unit that converts data suitable for its use or to efficiently manage the data by use of, for example, a pre-processor such as an audio/video codec.

The control unit 120 may control the overall operation of the RFID reading apparatus 100. The control unit 120 may perform protocol processing for an air interface communication protocol adjusted to process new commands and responses for transferring large data.

According to an exemplary embodiment, the control unit 120 may comprise a transmission packet generating unit 122 and a tag response processing unit 124.

The transmission packet generating unit 122 generates a transmission packet including data and a command that directs data transfer. Although the forms of the transmission packet that contains a new command may be defined as described with reference to FIGS. 2 to 4, a transmission packet that contains the existing READ and WRITE commands and an ACK or NACK command may be adjusted to be available for large data transfer.

According to an exemplary embodiment, the transmission packet may include a command field indicating a BURST command that directs large data transfer and a bitstream field containing bitstream data. The transmission packet may further include an important field indicating the integrity test result of the bitstream data. Moreover, the transmission packet may further include an identification field containing identification information for identifying each RFID tag to transfer data to a particular RFID tag.

The transmission packet generating unit 122 may generate a transmission packet containing a BURST ACK command that requests the RFID tag 200 to send a response for checking whether the RFID tag 200 has processed the transmission packet successfully.

The tag response processing unit 124 processes a tag response received from the RFID tag 200 through an RF signal.

The communication unit 130 converts the transmission packet generated by the control unit 120 into an RF signal and transmits the RF signal to the passive RFID tag 200. The communication unit 130 may signal-amplify or modulate the transmission packet to transfer the transmission packet to a predetermined bandwidth defined by the RFID standards, for example, a frequency band of between 860 MHz and 960 MHz. The communication unit 130 may include a modulator or a demodulator that may process signals either in a digital way or in an analog way.

Additionally, the control unit 120 may explicitly specify data to be transferred by use of a SELECT command and a tag selection procedure in the case of ISO18000-6 type, and transfer the selected data. Through such procedures, a peer-to-peer (P2P), multicast, and the like may be transferred.

Figure 6A:
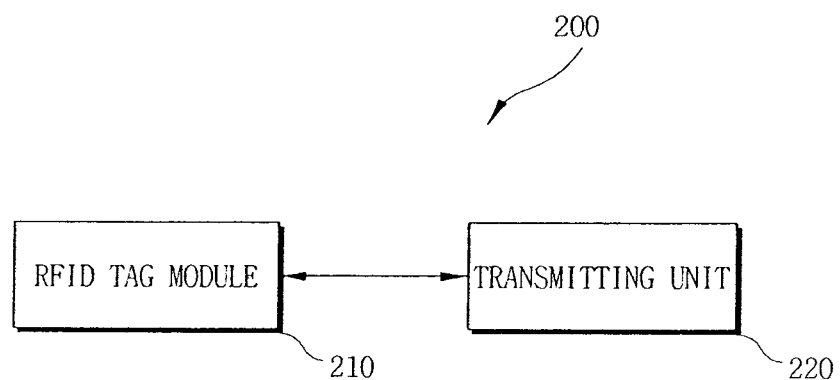
FIGS. 6A and 6B are block diagrams illustrating a passive RFID tag according to exemplary embodiments.
Figure 6B:
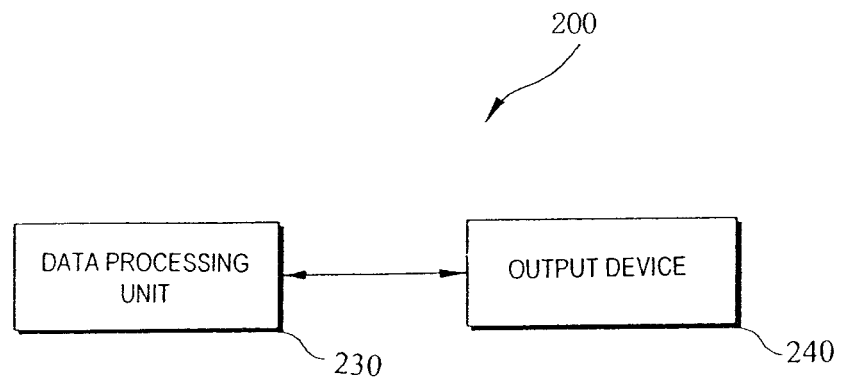

FIGS. 6A and 6B illustrate a passive RFID tag 200 according to exemplary embodiments. The passive RFID tag 200 in FIG. 6A comprises an RFID tag module 210 and a transmitting unit 220.

The RFID tag module 210, in response to receiving an RF signal, transmits data stored in the passive RFID tag 200 to an RFID reading apparatus by modulating an amplitude or phase of the RF signal to be a carrier frequency signal.

According to an exemplary embodiment, the RFID tag module 210 also processes a transmission packet containing data transferred through the RF signal and a command directing data transfer.

The RFID tag module 210 extracts data from the transmission packet containing a BURST command, and transmits the extracted data to the data transmitting unit 220. The extracted data may be stored in a non-volatile memory included in the passive RFID tag 200.

The data transmitting unit 220 transmits the data stored in the transmission packet to a various forms of a data processing device (not shown) including multimedia reproducing device or a data storing device. The data processing unit may reproduce the transmitted data and output a result. The data processing device may be embodied in the passive RFID tag 200 or external to the passive RFID tag 200.

According to an exemplary embodiment, the transmission packet includes an important field containing the integrity test result of the bitstream data. The RFID tag module 210 may request the RFID reading apparatus 100 that has sent the transmission packet to resend the transmission packet where the important field indicates that integrity of the bitstream is not maintained. Furthermore, the RF tag module 210 may interpret the identification information in the transmission packet for identifying each RFID tag, and process the transmission packet where the identification information of the transmission packet matches the identification information of the RF tag module 210.

In response to receiving a BURST ACK command that requests a response for checking whether the passive RFID tag 200 processed the transmission packet successfully, the RF tag module 210 send the result of processing the transmission packet.

As illustrated in FIG. 6B, the passive RFID tag 200 may selectively include a data processing unit 230 that processes data included in the transmission packet and reproduces it and an output device 240 such as speaker(s) and/or a display that outputs processed data. In this case, the passive RFID tag 200 may process and output the data included in the transmission packet using the data processing unit 230 and the output unit 240 which are included in the passive RFID tag 200 without transmitting the data to an external data processing device (not shown). The passive RFID tag 200 may be implemented in a device such as a wireless earphone, a headphone, a headset, a screen player, and so on.

Figure 7:
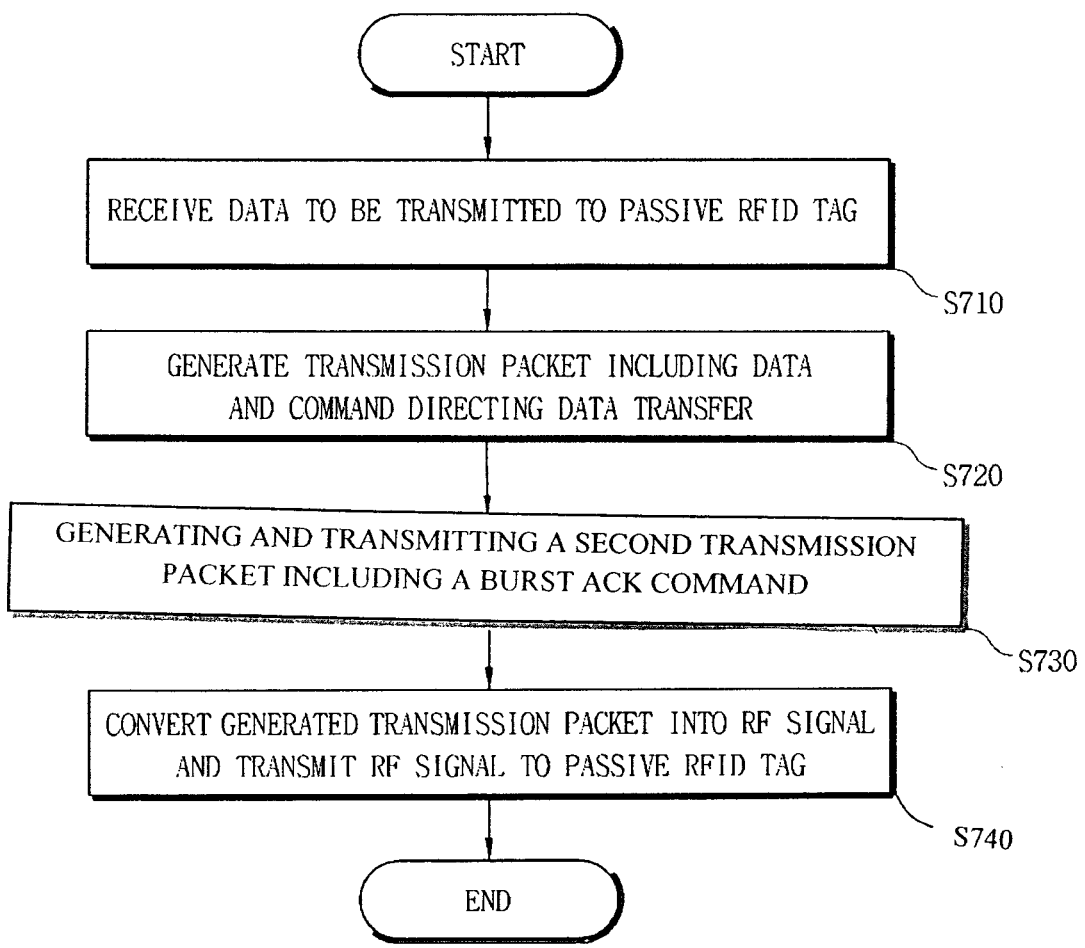
FIG. 7 is a flowchart illustrating a data transfer method of an RFID reading apparatus according to an exemplary embodiment.

FIG. 7 illustrates a flowchart of a data transfer method of an RFID reading apparatus according to an exemplary embodiment.

The RFID reading apparatus 100 (referring to FIG. 1) receives data to be transferred to the passive RFID tag 200 (referring to FIG. 1) from an external multimedia reproducing device or a storage device in operation S710.

The RFID reading apparatus 100 generates a transmission packet containing data and a command directing data transfer in operation S720. The transmission packet may include a command field indicating a BURST command directing large data transfer and a bitstream field including bitstream data. After transmitting the transmission packet containing the BURST command, the RFID reading apparatus 100 may generate and transmit a transmission packet containing a BURST ACK command that requests a response to check whether the RFID tag 200 has processed the transmission packet successfully in operation S730.

The RFID reading apparatus 100 converts the generated transmission packet into an RF signal and transmits the RF signal to the passive RFID tag 200 in operation S740.

Figure 8:
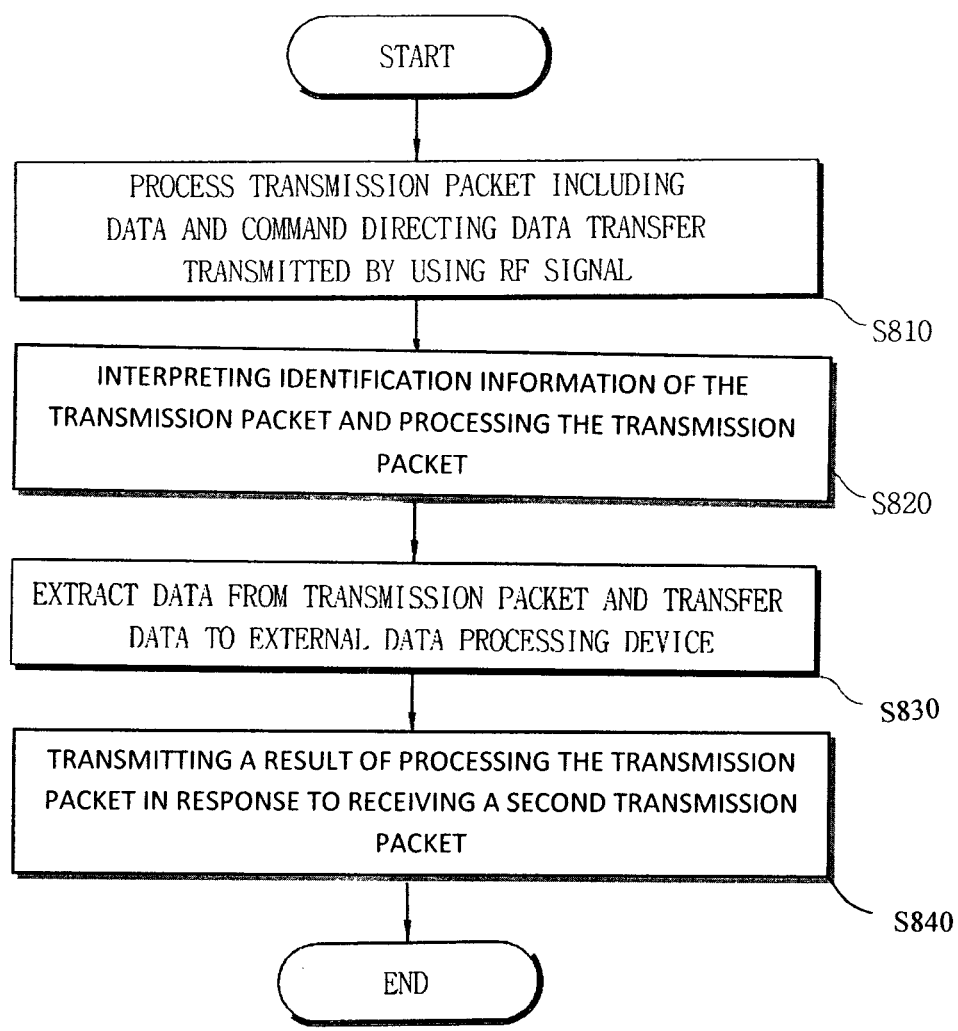
FIG. 8 is a flowchart illustrating a data processing method of a passive RFID tag according to an exemplary embodiment.

FIG. 8 illustrates a flowchart of a data processing method of a passive RFID tag according to an exemplary embodiment.

The passive RFID tag 200 (referring to FIG. 1) processes the transmission packet containing data and a command directing data transfer which has been transmitted through the RF signal from the RFID reading apparatus 100 (referring to FIG. 1) in operation S810. The passive RFID tag 200 interprets identification information in the transmission packet for identifying each RFID tag, and processes the transmission packet where the interpreted identification information is identical with identification information of the passive RFID tag 200 in operation S820.

The passive RFID tag 200 extracts data from the transmission packet and transfers the data to a data processing device in operation S830.

After receiving the transmission packet and in response to receiving a transmission packet containing a BURST ACK command that requests a response to check whether the RFID tag 200 has processed the transmission packet successfully, the passive RFID tag 200 may respond to the request in operation S840.

According to an exemplary embodiment, by using a passive RFID tag instead of a transceiver module, a transceiver chip, or a transceiver circuit which consumes a large amount of power for wireless communication, the power consumption of a wireless communication receiver may be substantially reduced. Moreover, a passive RFID tag in accordance with an exemplary embodiment may transfer large data to a data processing device, so as to implement "power-free" wireless transmission/receipt.

According to an exemplary embodiment, in the case of a passive RFID, a command of an RFID reading apparatus is received by all passive RFID tags around the RFID reading apparatus since the communication between the RFID reading apparatus and the passive RFID tags is basically in a broadcasting mode, and thus a receiver may receive data without a specific pairing operation. Hence, data transmitted from one RFID reading apparatus may be shared with various users where the received data is determined to be processed by a data processor.

According to an exemplary embodiment, an improved communication protocol may be established by defining a command and a response format for large data processing or adding a new command and a new response format by adjusting or expanding the existing passive RFID system.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A radio frequency identification (RFID) reading apparatus, comprising:
   a data input unit configured to receive data to be transferred to a passive RFID tag;
   a control unit configured to generate a first transmission packet including the received data and a command directing data transfer to make the passive RFID tag transfer the received data to an external data processing and/or storing apparatus, and a second transmission packet comprising a command requesting the passive RFID tag to return a response as to whether the passive RFID tag has transferred the data to the external data processing and/or storing apparatus successfully; and
   a communication unit configured to convert the generated first and second transmission packets into an RF signal, and transfer the converted RF signal to the passive RFID tag.

2. The RFID reading apparatus of claim 1, wherein the data includes audio data, image data, data files, or any combination thereof.

3. The RFID reading apparatus of claim 1, wherein the data input unit receives the data from an external multimedia reproducing device or a storage medium.

4. The RFID reading apparatus of claim 1, wherein the command directing data transfer comprises a command field indicating a BURST command that directs data transfer, and
   wherein the first transmission packet further comprises a bitstream field including bitstream data.

5. The RFID reading apparatus of claim 4, wherein the first transmission packet further comprises an important field that indicates an integrity test result of the bitstream data.

6. The RFID reading apparatus of claim 4, wherein the first transmission packet further comprises an identification field configured to comprise identification information to identify an RFID tag in order to transfer data to a particular RFID tag.

7. The RFID reading apparatus of claim 4, wherein the second transmission packet comprises a BURST ACK command to check whether the passive RFID tag has processed the first transmission packet successfully after the first transmission packet including the BURST command is received, the BURST ACK command requesting the response as to whether the passive RFID tag has transferred the data to the external data processing and/or storing apparatus successfully.

8. A passive radio frequency identification (RFID) tag comprising:
   an RFID tag module configured to process a first transmission packet that comprises data and a command directing data transfer transmitted through an RF signal to force a transfer of the data to an external data processing and/or storing apparatus, and a second transmission packet comprising a command requesting a response as to whether the data has been transferred to the external data processing and/or storing apparatus successfully; and
   a data transmitting unit configured to extract data from the first transmission packet and transfer the extracted data to the external data processing and/or storing apparatus.

9. The passive RFID tag of claim 8, wherein the data includes audio data, image data, data files, or any combination thereof.

10. The passive RFID tag of claim 8, wherein the command directing data transfer comprises a command field indicating a BURST command that directs data transfer, and
    wherein the first transmission packet further comprises a bitstream field including bitstream data.

11. The passive RFID tag of claim 10, wherein the first transmission packet further comprises an important field configured to indicate an integrity test result of the bitstream data.

12. The passive RFID tag of claim 11, wherein the RFID tag module interprets identification information of the first transmission packet to identify an RFID tag and processes the first transmission packet where the interpreted identification information is identical with the identification information of the passive RFID tag, and
    wherein the RFID tag module requests an RFID reading apparatus, which has sent the first transmission packet, to resend the first transmission packet where information of the important field indicates that the integrity of the bitstream data is not maintained.

13. The passive RFID tag of claim 10, wherein the second transmission packet comprises a BURST ACK command to check whether the first transmission packet has been processed by the RFID tag module successfully after the first transmission packet including the BURST command has been received, and
    wherein the data transmitting unit transmits the response as to whether the data has been transferred to the external data processing and/or storing apparatus successfully in response to the BURST ACK command.

14. The passive RFID tag of claim 8, further comprising:
    a data processing unit configured to process the data extracted from the first and second transmission packets; and
    an output unit configured to output the processed data.

15. A data transfer method of a radio frequency identification (RFID) reading apparatus, the data transfer method comprising:
    receiving data to be transferred to a passive RFID tag;
    generating a first transmission packet comprising the received data and a command directing data transfer to make the passive RFID tag transfer the received data to an external data processing and/or storing apparatus, and a second transmission packet comprising a command requesting the passive RFID tag to return a response as to whether the passive RFID tag has transferred the data to the external data processing and/or storing apparatus successfully;
    converting the generated first and second transmission packets into an RF signal; and
    transferring the RF signal to the passive RFID tag.

16. The data transfer method of claim 15, wherein the command directing data transfer comprises a command field indicating a BURST command that directs data transfer, and
    wherein the first transmission packet further comprises a bitstream field including bitstream data.

17. The data transfer method of claim 16, wherein the second transmission packet comprises a BURST ACK command to check whether the passive RFID tag has processed the first transmission packet successfully after the first transmission packet including the BURST command is received, the BURST ACK command requesting the response as to whether the passive RFID tag has transferred the data to the external data processing and/or storing apparatus successfully.

18. A data processing method of a passive radio frequency identification (RFID) tag, the method comprising:
 processing a first transmission packet that comprises data and a command directing data transfer transmitted through an RF signal from an RFID reading apparatus to force a transfer of the data to an external data processing and/or storing apparatus, and a second transmission packet comprising a command requesting a response as to whether the data has been transferred to the external data processing and/or storing apparatus successfully; and
 extracting data from the first transmission packet and transferring the extracted data to the external data processing and/or storing apparatus.

19. The data processing method of claim 18, further comprising:
 interpreting identification information of the first transmission packet to identify an RFID tag; and
 processing the first transmission packet where the interpreted identification information is identical with the identification information of the passive RFID tag.

20. The data processing method of claim 18, wherein the second transmission packet comprises a BURST ACK command to check whether the first transmission packet has been processed by the RFID tag module successfully after the first transmission packet including a BURST command has been received, and
 wherein the extracting of the data comprises transmitting the response as to whether the data has been transferred to the external data processing and/or storing apparatus successfully in response to the BURST ACK command.

* * * * *